US010755459B2

(12) United States Patent
Chen et al.

(10) Patent No.: US 10,755,459 B2
(45) Date of Patent: Aug. 25, 2020

(54) OBJECT PAINTING THROUGH USE OF PERSPECTIVES OR TRANSFERS IN A DIGITAL MEDIUM ENVIRONMENT

(71) Applicant: Adobe Inc., San Jose, CA (US)

(72) Inventors: Zhili Chen, San Jose, CA (US); Srinivasa Madhava Phaneendra Angara, Noida (IN); Duygu Ceylan Aksit, Mountain View, CA (US); Byungmoon Kim, Sunnyvale, CA (US); Gahye Park, Goyang-si (KR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/297,938

(22) Filed: Oct. 19, 2016

(65) Prior Publication Data

US 2018/0108160 A1    Apr. 19, 2018

(51) Int. Cl.
*G06T 11/60* (2006.01)
*G06F 3/0481* (2013.01)
*G06T 11/00* (2006.01)

(52) U.S. Cl.
CPC .......... *G06T 11/60* (2013.01); *G06F 3/04815* (2013.01); *G06T 11/001* (2013.01); *G06T 2200/24* (2013.01)

(58) Field of Classification Search
None
See application file for complete search history.

(56) References Cited

U.S. PATENT DOCUMENTS 6,226,000 B1 *   5/2001   Richens .................. G06T 15/04
                                                345/419
6,268,865 B1 *   7/2001   Daniels .................. G06T 11/001
                                                345/582

(Continued)

FOREIGN PATENT DOCUMENTS

EP         2133819       12/2009
EP         2755164        7/2014
WO    WO-2016124777       8/2016

OTHER PUBLICATIONS

Adams,"Interactive 3D Painting on Point-Sampled Objects", Eurographics Symposium on Point-Based Graphics (2004), Jun. 2004, 10 pages.

(Continued)

*Primary Examiner* — Edward Martello
(74) *Attorney, Agent, or Firm* — SBMC

(57) ABSTRACT

Techniques and systems are described herein that support improved object painting in digital images through use of perspectives and transfers in a digital medium environment. In one example, a user interacts with a two-dimensional digital image in a user interface output by a computing device to apply digital paint. The computing device fits a three-dimensional model to an object within the image, e.g., the face. The object, as fit to the three-dimensional model, is used to support output of a plurality of perspectives of a view of the object with which a user may interact to digitally paint the object. As part of this, digital paint as specified through the user inputs is applied directly by the computing device to a two-dimensional texture map of the object. This may support transfer of digital paint by a computing device between objects by transferring the digital paint using respective two-dimensional texture maps.

20 Claims, 11 Drawing Sheets

(56) References Cited

U.S. PATENT DOCUMENTS

| | | | | |
|---|---|---|---|---|
| 6,529,206 B1* | 3/2003 | Ohki | ............ | G06T 15/20 |
| | | | | 345/427 |
| 8,660,319 B2* | 2/2014 | Aarabi | ............ | G06K 9/00228 |
| | | | | 382/100 |
| 8,908,904 B2* | 12/2014 | Santos | ............ | H04N 5/23229 |
| | | | | 382/100 |
| 9,058,765 B1* | 6/2015 | Mallick | ............ | G06F 3/0482 |
| 2009/0027412 A1* | 1/2009 | Burley | ............ | G06T 15/04 |
| | | | | 345/582 |
| 2010/0053172 A1* | 3/2010 | DeRose | ............ | G06T 13/00 |
| | | | | 345/473 |
| 2013/0057540 A1* | 3/2013 | Winnemoeller | ............ | G06T 15/80 |
| | | | | 345/419 |
| 2013/0120394 A1 | 5/2013 | DiVerdi | | |
| 2013/0121612 A1* | 5/2013 | Falco, Jr. | ............ | G06T 11/00 |
| | | | | 382/275 |

OTHER PUBLICATIONS

Baxter,"DAB: Interactive Haptic Painting with 3D Virtual Brushes", In Proceeding of ACM SIGGRAPH (2001), Aug. 12, 2001, 8 Pages.
"Combined Search and Examination Report", GB Application No. 1713605.2, dated Feb. 1, 2018, 8 pages.

\* cited by examiner

OBJECT PAINTING THROUGH USE OF PERSPECTIVES OR TRANSFERS IN A DIGITAL MEDIUM ENVIRONMENT

BACKGROUND

Users collect and share an ever increasing number of digital images due to the proliferation of devices that may be used to capture these digital images as well as techniques that may be used to share the digital images, such as social networks, messaging, and so forth. As part of this, techniques have been developed to add digital paint to the digital images. For example, users may draw animal features on a face of a user in a digital image as virtual face paint as a fun way to create digital images that may be of interest to other users.

Conventional techniques to do so, however, may be difficult to perform and lack realism. For example, users may have difficulty in applying digital paint to a face of a user in a two-dimensional digital image in a realistic manner that addresses the contours and shape of the face. Accordingly, results of this conventional technique may lack realism and are thus limited to cartoonish caricatures. In another example, conventional techniques have been developed that support direct interaction with a three-dimensional surface. However, this interaction requires specialized knowledge on the part of the user to directly paint to the three-dimensional surface. For instance, these conventional techniques that involve three dimensions involve interactions with and application of digital paint as part of a defined three-dimensional surface. As part of this, complex non-intuitive manipulations (e.g., three-dimensional rotations and translations) are used to apply digital paint that is stored as part of the defined three-dimensional surface. This limits these conventional techniques to use by sophisticated users as well as limits that applicability of this digital paint to that defined three-dimensional surface.

SUMMARY

Techniques and systems are described herein that support improved object painting in digital images through use of perspectives and transfers in a digital medium environment. In one example, a user interacts with a two-dimensional digital image in a user interface output by a computing device to apply digital paint. To support this, the computing device fits a three-dimensional model to an object within the image, e.g., the face. The object, as fit to the three-dimensional model, is used to output a plurality of perspectives of a view of the object with which a user may interact to digitally paint the object. User inputs, for instance, may be received by the computing device to rotate a user's face in order to apply paint to a user's cheek. Thus, a perspective may be generated that is not included initially as part of the two-dimensional digital image to improve a user's ability to paint the object.

As part of this, digital paint as specified through the user inputs is applied directly by the computing device to a two-dimensional texture map of the object as opposed to a three-dimensional surface in conventional techniques. In this way, simplified digital paint controls may be supported. This may also support transfer of digital paint by a computing device between objects by transferring the digital paint using respective two-dimensional texture maps. Thus, a user is not forced to manually recreate the digital paint.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
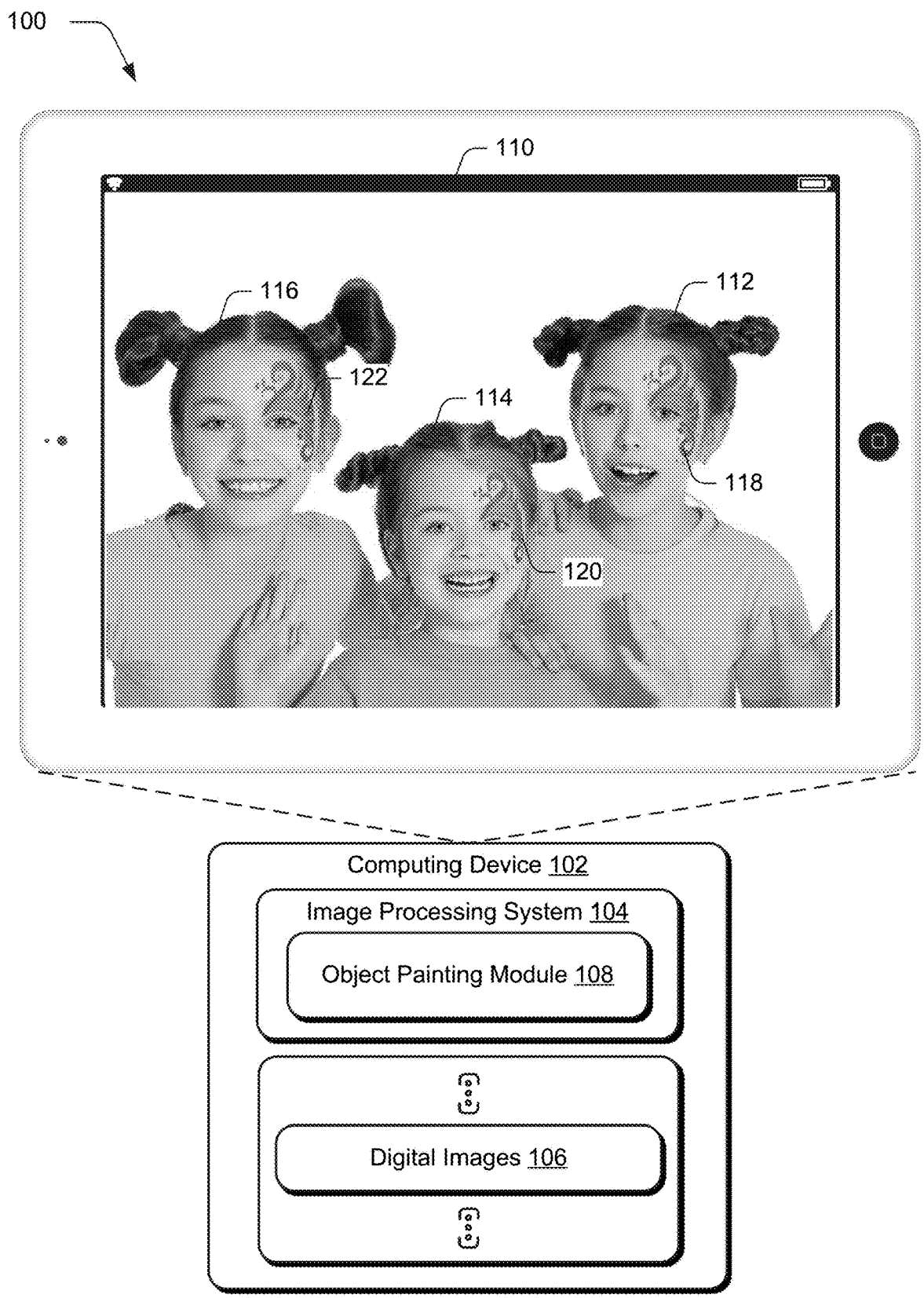
FIG. 1 is an illustration of a digital medium environment in an example implementation that is operable to employ techniques for improved object painting through use of perspective or transfers.

Digital painting of objects in a digital image has emerged as a popular way with which users may interact with each other, e.g., via social networks, chats, messaging, and so forth to increase interest in digital images. Some objects, however, may be difficult to digitally paint using conventional techniques. An example of this is faces and other objects that exhibit a variety of contours. Applying digital paint to a face of a person in a digital image, for instance, may be difficult using conventional techniques due to conventional limitations in viewing these contours from a single perspective. Because of this, the user may not readily understand how the contours affect application of digital paint to the object, e.g., how to apply digital paint on a vanishing surface. As a consequence, conventional techniques may lack realism and fail for its intended purpose, such as to mimic actual physical paint as applied to the object.

Accordingly, techniques and systems are described herein that support improved object painting in digital images through use of perspectives and transfers in a digital medium environment. In one example, a user interacts with a two-dimensional digital image in a user interface output by a computing device. As part of this interaction, the computing device receives an input indicating that the digital paint is to be applied to an object in the digital image, e.g., a face.

In response, the computing device fits a three-dimensional model to the object, e.g., the face. This may be performed in a variety of ways, such as by detecting landmarks in the object, e.g., corners of the eyes and mouth, tip of the nose, and so forth. These landmarks are then used to fit the object to corresponding landmarks of the three-dimensional model.

The object, as fit to the three-dimensional model, is thus used to support output of a plurality of perspectives of a view of the object with which a user may interact to digitally paint the object. User inputs, for instance, may be received by the computing device to rotate a user's face from an original perspective in which the user is looking directly at a camera to a rotated perspective in which an additional portion of the user's face may be viewed, e.g., a side of the user's cheek. User inputs may then be received at this rotated perspective to paint on the user's cheek. Once completed, the perspective is returned to the original perspective having the digital paint as applied to the object. In this way, a user may intuitively interact with different perspectives of an object to apply digital paint without having detailed knowledge of complicated conventional three-dimensional painting techniques.

As part of this, digital paint as specified through the user inputs is applied directly by the computing device to a two-dimensional texture map of the object, e.g., the face, and not to the three-dimensional model to which the object is fit. A two-dimensional texture map is used to describe how the object is fit to the three-dimensional model through alignment of points of the model to landmarks of the object, e.g., corners of the eyes, tip of the nose, and so forth in a face. In this way, the texture map indicates correspondence of portions of the object to respective portions of the three-dimensional model. This is then used to "wrap" the object from the digital image "over" the three-dimensional model to display the object in three-dimensional space. This display is then manipulated through user interaction to view different perspective of the object, e.g., front, side, and increments in-between.

In an implementation described herein, instead of applying digital paint on the three-dimensional model that includes the object, a two-dimensional painting engine is used to paint directly on the two-dimensional texture map. This has numerous benefits. In one such example, this supports use of a simplified two-dimensional paint engine to digitally paint the two-dimensional texture map that has controls that are readily understood by a user (e.g., simple brush selection), as opposed to controls employed by conventional three-dimensional paint engines that require specialized knowledge to manipulate the model and apply the digital paint to the model in three dimensions.

Another benefit is that the digital paint may be readily transferred between objects within the same or different digital images. For example, the mapping from the three-dimensional model (e.g., the face) and the two-dimensional texture maps may be configured to be universal across objects of the same type. For instance, faces modeled using the same three-dimensional model may use two-dimensional texture maps having matching configurations, e.g., corresponding points and polygons formed from these points.

Digital paint applied to a first face, for instance, may be readily transferred from a two-dimensional texture map of the first face to a two-dimensional texture map of a second face due to correspondences between the maps. In this way, the same digital paint may be transferred to multiple objects that share a model without manually recreating the digital paint. Further discussion of these and other examples is included in the following sections, including the leveraging of semantic labels to control where the digital paint may be applied to the object, e.g., to prevent digital paint from being applied to the eyes of a face. Although an example of objects is described in the following as faces, objects may include any object that is capable of being modeled in three-dimensional space.

In the following discussion, an example digital medium environment is first described that may employ the techniques described herein. Example procedures are then described which may be performed in the example digital medium environment as well as other environments. Consequently, performance of the example procedures is not limited to the example environment and the example environment is not limited to performance of the example procedures.

Example Environment

FIG. 1 is an illustration of a digital media environment 100 in an example implementation that is operable to employ techniques described herein. The illustrated digital medium environment 100 includes a computing device 102 configured for use in digitally painting objects in digital images, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 11.

The computing device 102 is illustrated as including an image processing system 104. The image processing system 104 is implemented at least partially in hardware to transform two-dimensional digital images 106, which are also referred to as "digital images" and "images 106" in the following for the sake of brevity. Transformation of images includes creation, editing, and other modification to digital images 106 that are stored in a computer-readable storage medium of the computing device 106. An example of such functionality is illustrated as an object painting module 108. The object painting module 108 is implemented at least partially in hardware of the computing device 102 (e.g., operations stored in a computer-readable storage medium and executable on a processing system) to apply digital paint to objects in digital images 106.

An example of this is shown by a digital image as rendered in a user interface of a display device 110 of the computing device 102. As illustrated, the user interface includes first, second, and third objects that are a first face 112, a second face 114, and a third face 116 in this example.

These techniques are equally applicable to any other object included in a two-dimensional digital image capable of being modeled in three dimensions. The object painting module 108 in this example is employed by a user to transform the first, second, and third faces 112, 114, 116 of the digital image 106 to include digital paint 118, 120, 122, respectively.

The object painting module 108, for instance, may output tools and commands in a user interface that are selectable by a user to cause an appearance of digital paint as applied to a surface of objects within the digital image. As shown in the user interface of the display device 110, the digital paint 118, 120, 122 is face paint that mimics application of paint in real life to surfaces of the faces as commonly found at carnivals, kid's birthday parties, and so forth. To do so on a two-dimensional digital image, however, is challenging using conventional techniques, such as to apply the digital paint to an object having a diminishing contour, such as the cheek and side of the faces.

However, the techniques described herein support generation of different perspectives of the object, e.g., the faces, such that a user may digitally paint a surface of the object with increased accuracy. An example of this is described in relation to FIGS. 2-4 in the following description. Further, this digital paint may be applied directly to a two dimensional texture map, and thus supports use of a two dimensional painting engine as further described in relation to FIG. 5 as well as transfer to different objects as further described in relation to FIGS. 6 and 7. Semantic labels defined as part of a three-dimensional model used to generate the different perspectives may also be used to control application of the digital paint, such as to restrict application of digital paint to certain parts of the object, such as the eyes of a user as further described in relation to FIG. 8.

Figure 2:
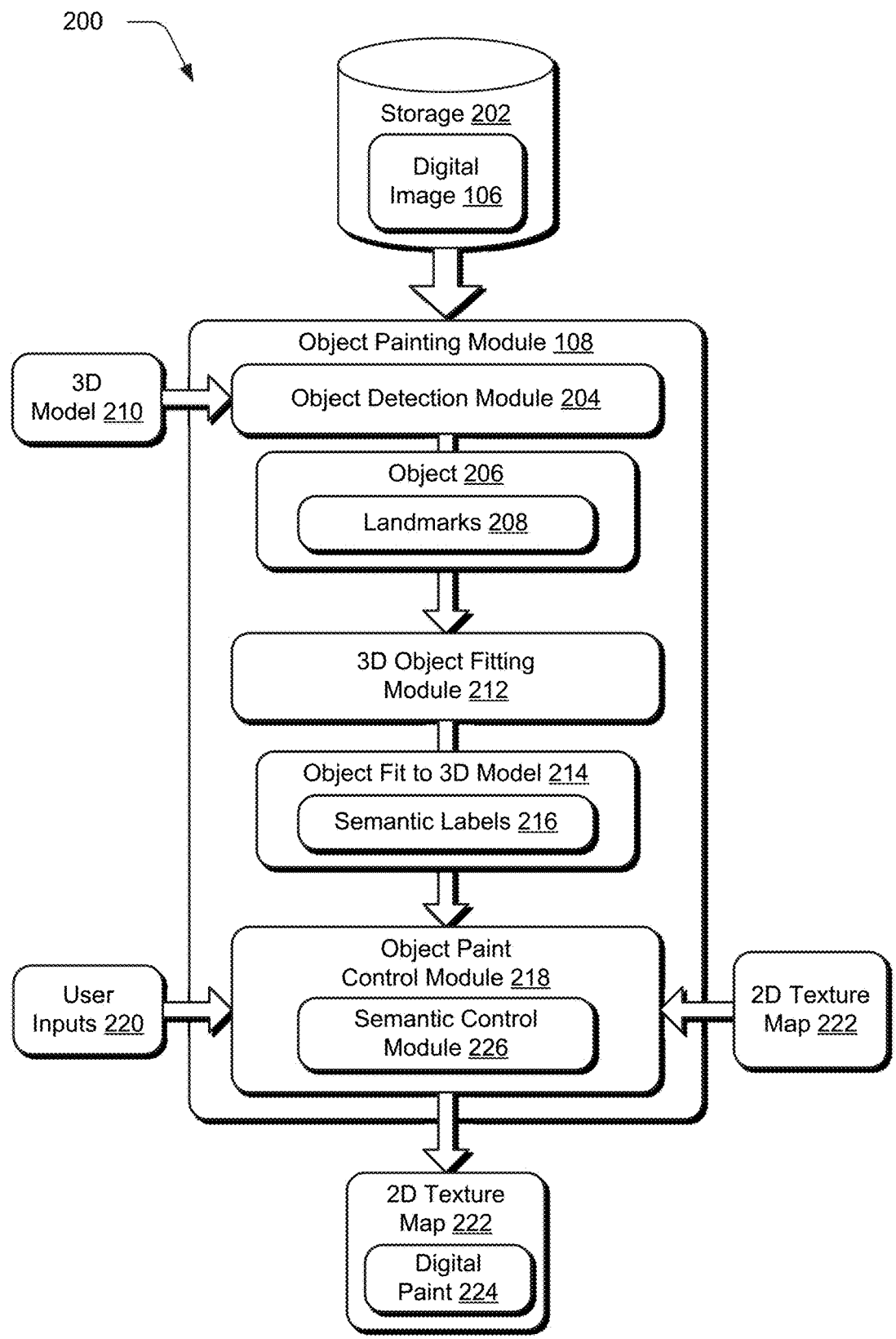
FIG. 2 depicts a system in an example implementation showing operation of an object painting module of FIG. 1 in greater detail.

FIG. 2 depicts a system 200 in an example implementation that supports techniques to apply digital paint to an object in a two-dimensional digital image 106. To begin, the object painting module 108 is initiated to support application of digital paint to a digital image 106. The digital image 106, for instance, may be obtained from storage 202 (e.g., local to or remote from the computing device 102 of FIG. 1) and displayed on a displace device 110 of FIG. 1. A user input is then received indicating that application of digital paint to an object in the digital image 106 is desired, such as to enter a "painting mode," selection of a representation of a digital painting operation in a user interface, and so forth.

In response, an object detection module 204 is initiated by the object painting module 108. The object detection module 204 is implemented at least partially in hardware of the computing device 102 to detect an object 206 and landmarks 208 within the object 206 based on a 3D model 210, an example of which is described in the following and shown in a corresponding figure.

Figure 3:
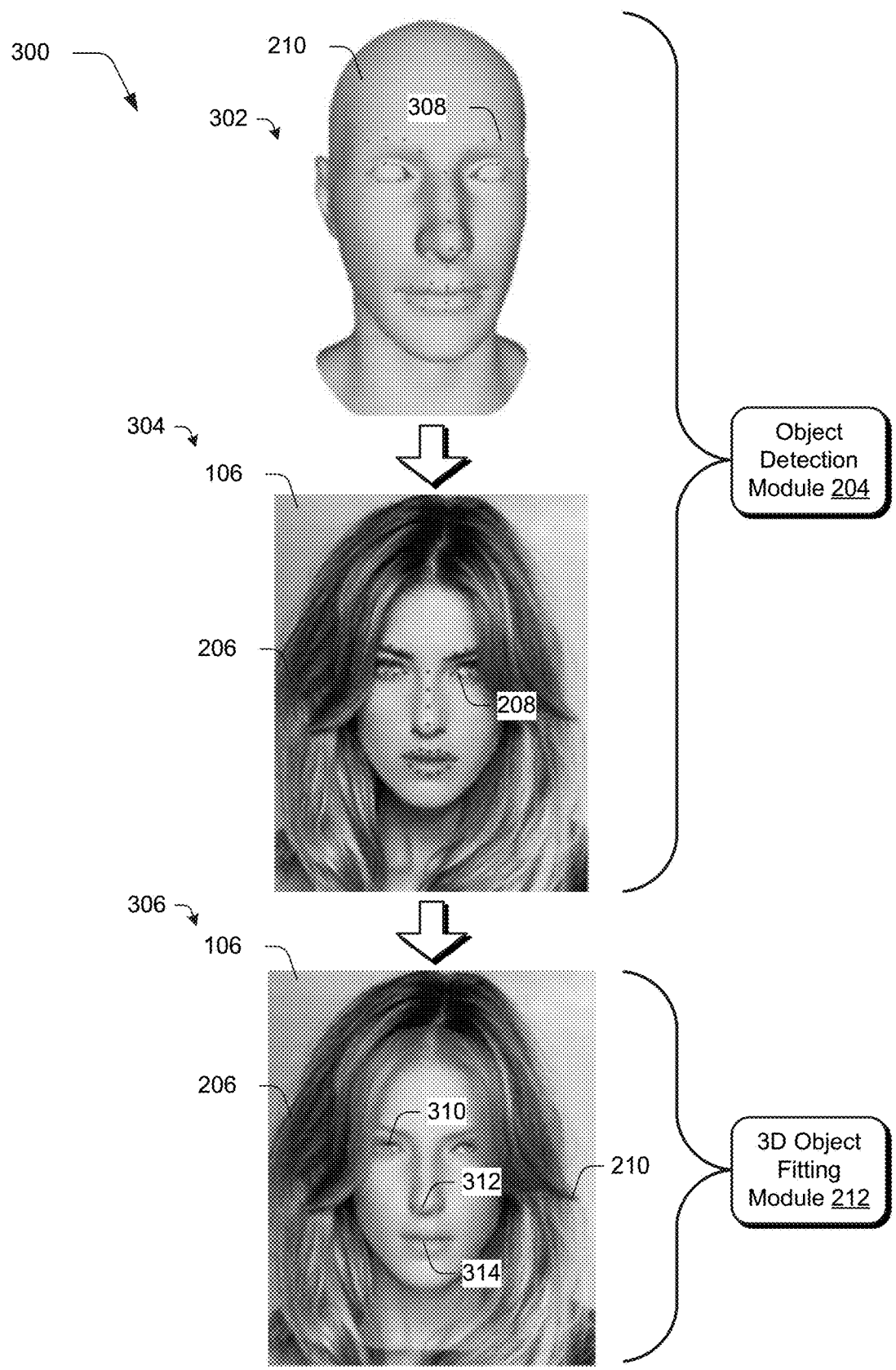
FIG. 3 depicts an example implementation of detection of an object and landmarks within the object in a digital image through use of the object detection module and fit the object to a 3D model by a 3D object fitting module of FIG. 2.

FIG. 3 depicts an example implementation 300 of detection of the object 206 and landmarks 208 with the object in a digital image 106 through use of the object detection module 204 and fit the object 206 to a 3D model 210 by a 3D object fitting module 212 of FIG. 2. This implementation is illustrated using first, second, and third stages 302, 304, 306. At the first stage 302, the object detection module 204 receives a 3D model 210. The 3D model 210 has defined points 308 that are used to fit the object 206 to the model, e.g., the user's face. Accordingly, the object detection module 204 begins detection of the object 206 by first locating landmarks 208 of the object 206 in the digital image 106 that correspond to defined points 308 of the 3D model 210.

The object detection module 204, for instance, first detects location of eyes as landmarks 208 within the digital image 106. This may be performed as part of an image search that begins proximal to a location as specified by a user, e.g., to specify a particular object in an image that has a plurality of the objects. A user input, for instance, may be generated by "clicking" on particular one of the faces 112, 114, 116 as displayed by the display device 110 using a cursor control device or touchscreen functionality through use of a gesture. This may also be performed automatically and without user intervention, e.g., in instances in which a single or primary object (e.g., the largest object) is included in the digital image 106.

As shown at the second stage 304, once the location of the eyes is detected as landmarks 208 within the digital image 106, the object detection module 204 may then expand an area within the digital image 206 to locate other landmarks 208. These other landmarks 208, as defined by the points 308 of the 3D model 210, may include corners and borders of the eyes, edges of the nose, chin, and eyebrows, and other landmarks 208 using an image search and object recognition.

The detected object 206 is then fit by a 3D object fitting module 212 to the 3D model 210. At the third stage 306, for instance, the landmarks 208 of the object 206 are matched to corresponding points 308 of the 3D model 210. This correspondence is used to generate a combination of the object 206 as fit to the 3D object module 210. In other words, correspondence of the landmarks 208 of the object 206 to corresponding points of the 3D model 210 are used to wrap the object "over" the 3D model, thereby resulting in the object as fit to the 3D model 214 in the system 200 of FIG. 2.

As part of this fitting, the 3D model 210 may include semantic labels 216 that are assigned to corresponding portions of the object 206. The semantic labels 216, for instance, may define which portions of the object 206 include the eyes 310, nose 312, lips 314, and so forth as shown at the third stage 306 of FIG. 3. This may then be used to control application of digital paint to these portions, an example of which is further described in relation to FIG. 8.

The object as fit to the object model 214 is then provided as an input to an object paint control module 218 for use in generating a variety of different perspectives of the object 206 that are viewable within a user interface. An example of which is described in the following and shown in a corresponding figure.

Figure 4:
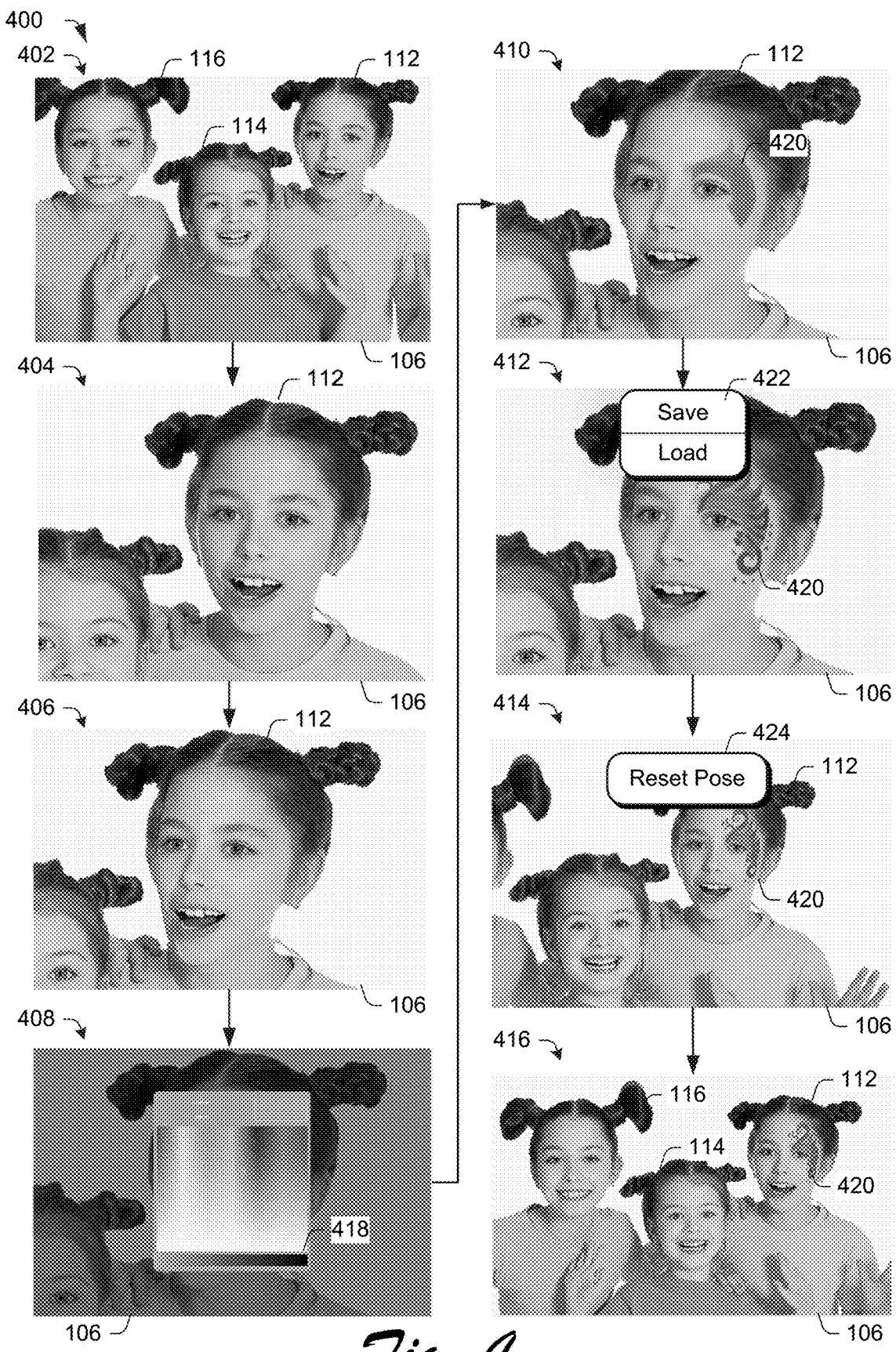
FIG. 4 depicts an example implementation in which a change in perspective is employed to apply digital paint to an object in a digital image through use of the object as fit to a three-dimensional model of FIGS. 2 and 3.

FIG. 4 depicts an example implementation 400 in which a change in perspective is employed to apply digital paint to an object in a digital image through use of the object as fit to the three-dimensional model 214 of FIG. 2. This example implementation 400 is illustrated using first, second, third, fourth, fifth, sixth, seventh, and eighth stages 402, 404, 406, 408, 410, 412, 414, 416.

At the first stage 402, a digital image 106 is received by the object painting module 108 of FIG. 2. The digital image 106 includes first, second, and third faces 112, 114, 116. A user input is then received to "zoom in" on a view of the first face 112 in the user interface as shown at the second stag 404.

At the third stage 406, a user input is received by the object painting module 108 to initiate digital painting of the first face 112. In response, the object painting module 108 employs the object detection module 204 and 3D object fitting module 212 to fit the object to the 3D model 214 as previously described in relation to FIGS. 2 and 3. This is then used by the object paint control module 218 to control output of the object in the user interface to support navigation between different perspectives of the object.

In the illustrated example, a user wishes to apply digital paint around an eye and on the cheek of the first face 112. Accordingly, the combination of the object (e.g., the first face) with the 3D model is used to change a perspective of the first face 112 such that a side of the user's interface that was not originally viewable in the two-dimensional digital image 106 is now viewable through manipulation in three-dimensional space. The user, for instance, may "grab and pull" the first face 112 using a cursor control device or gesture to view the object at a desired perspective.

At the fourth stage 408, an option 418 is output in the user interface usable to select a color of digital paint to be applied to the first face 112. At the fifth stage 410, the digital paint 420 is applied to the first face 112 at the changed perspective. In this way, a user is provided with an increased view of the object that is not otherwise available from the two-dimensional digital image 106. Once the digital paint 420 is applied as desired, an option is provided to save 422 the digital paint as shown at the sixth stage 412. Selection of a "reset pose" 424 option is used to return a view of the object to an original perspective as included in the digital image 106, but includes the digital paint 420. Thus, as shown at the eighth stage 416 the digital paint 420 is configured to follow contours of the first face 112 that is realistic and natural, and the paint is applied in a manner that is intuitive without requiring knowledge of advanced 3D object manipulation techniques.

As shown in FIG. 2, for instance, the object paint and control module 218 accepts user inputs 220 to digitally paint the digital image 106. This is performed through use of a two-dimensional texture map 222 to form a 2D image texture map 22 to which the digital paint 224 is applied, as opposed to conventional application of digital paint to a three-dimensional surface that requires knowledge of complicated three-dimensional paint engines to navigate and map the digital paint in three dimensions.

Figure 5:
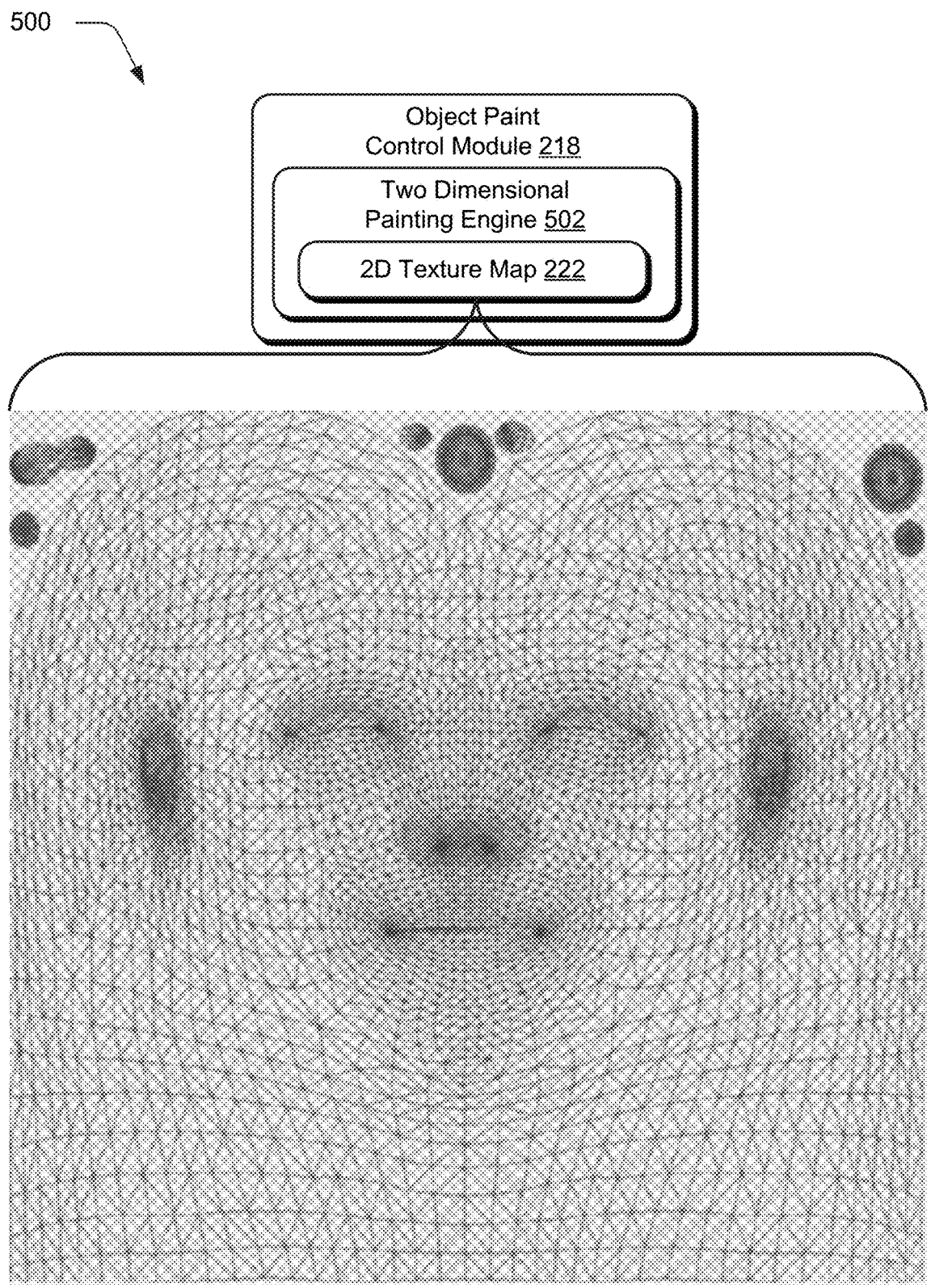
FIG. 5 depicts an example implementation in which a two-dimensional painting engine is employed to paint directly to a two-dimensional texture map of an object by an object paint control module of FIG. 2.

FIG. 5 depicts an example implementation 500 in which a two-dimensional painting engine 502 is employed to paint directly to a two-dimensional texture map 222 of an object. The two-dimensional texture map 222 is formed using a plurality of polygons. The polygons of the two-dimensional texture map 222, for instance, may be defined at least in part based on correspondence of landmarks 208 of the object 206 to points 308 on the 3D model 210. Through implementation in two dimensions, a two-dimensional painting engine 502 may be employed to paint directly to the two-dimensional texture map 222, which is then "stretched over" the 3D model 210 to support the display that is navigable in three-dimensional space as described in relation to FIG. 4.

As a result, a user may readily navigate between different perspectives of an object in a two-dimensional digital image 106 and apply digital paint using readily understood techniques supported by the two-dimensional painting engine 502. By directly painting on the two-dimensional texture map 222, techniques are also supported to transfer the digital paint between objects within a digital image and/or to another digital image, an example of which is described as follows and is shown in corresponding figures.

Figure 6:
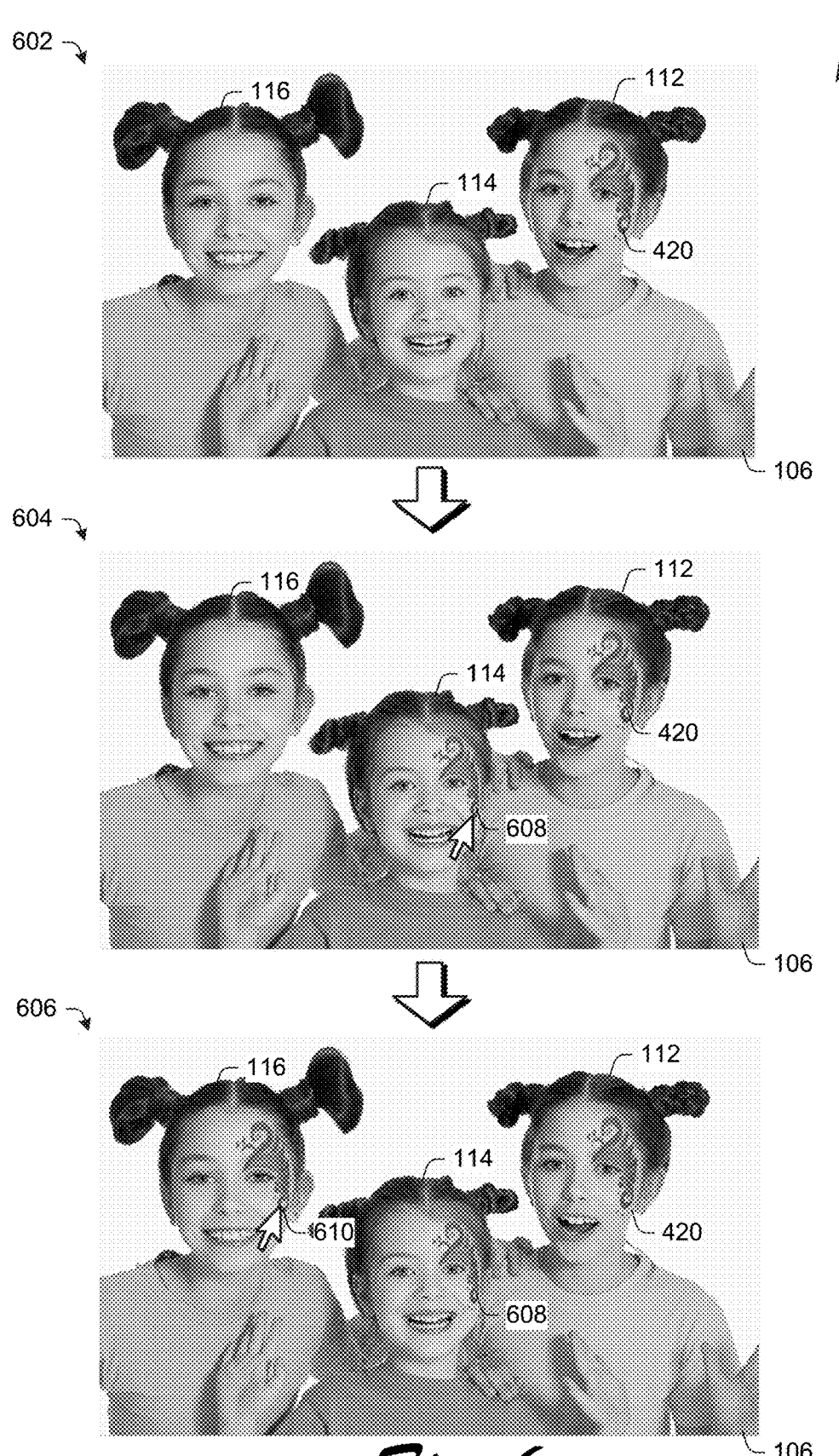
FIGS. 6 and 7 depict example implementations which digital paint is transferred between objects through use of two-dimensional texture maps of objects.

FIG. 6 depicts an example implementation 600 in which digital paint is transferred between objects through use of two-dimensional texture maps of objects. FIG. 6 is illustrated using first, second, and third stages 602, 604, 606. At the first stage 602, digital paint 420 is rendered as being applied to a first face 112 through use of a two-dimensional texture map.

At the second stage 604, a user input is received that indicates that the digital paint 420 from the first face 112 is to be transferred to the second face 114, e.g., by "clicking" on the second face. In response, the object paint control module 218 transfers the digital paint 420 from a 2D texture map of the first face to a 2D texture of the second face 114. A result of this is displayed in the user interface as digital paint 608. This process may also continue for the third face 116 to transfer the digital paint 420 for display as digital paint 610. The two-dimensional texture maps may thus be used to transfer the digital paint 420 to other objects without manually recreating the digital paint. A detailed example of this is described in the following.

Figure 7:
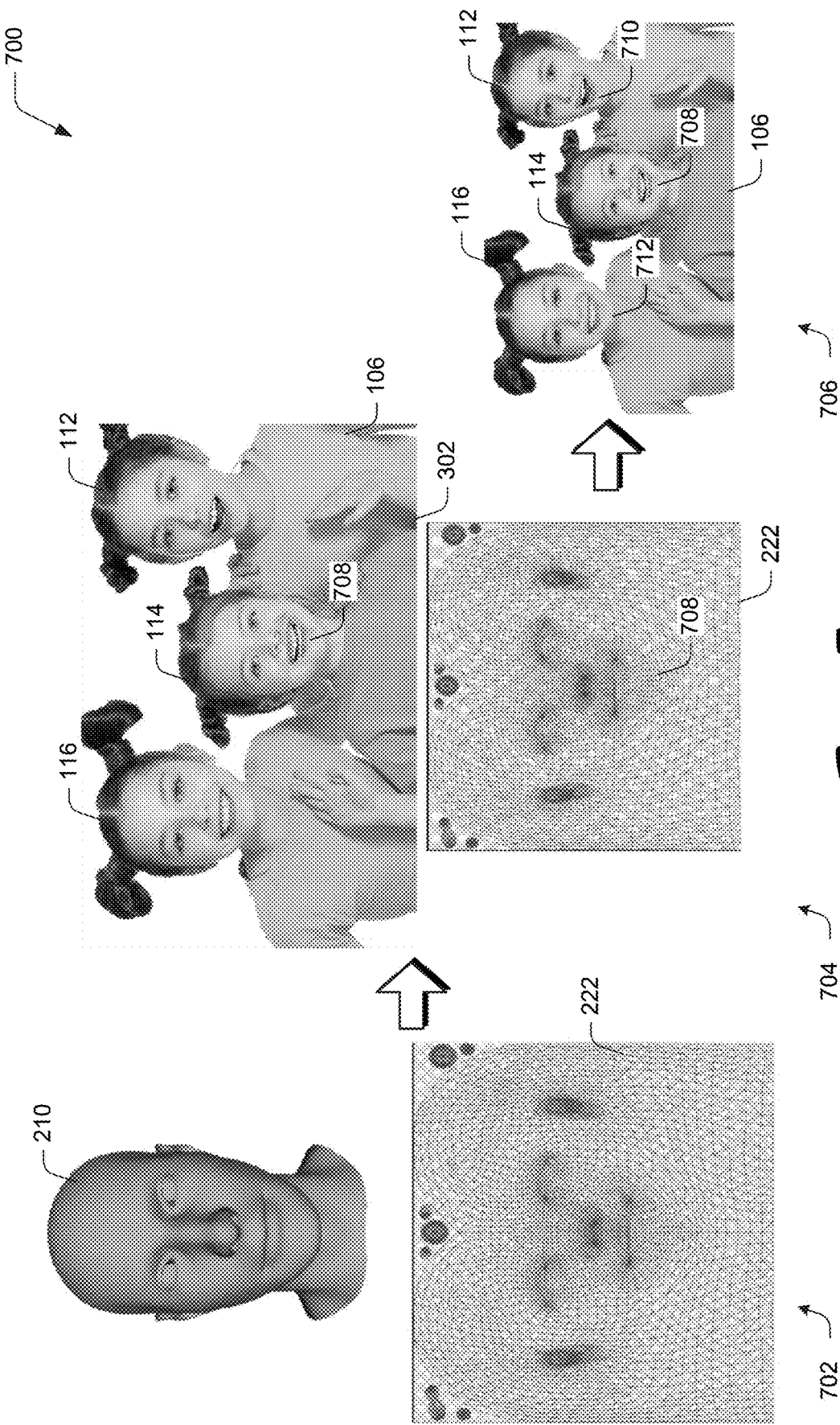

FIG. 7 also depicts an example implementation 700 in which digital paint is transferred between objects through use of two-dimensional texture maps of objects. FIG. 7 is illustrated using first, second, and third stages 702, 704, 706. At the first stage 702, a 3D model 210 and corresponding two-dimensional texture map 222 are shown. As previously described, the two-dimensional texture map 222 defines how the object corresponds to the 3D model 210 and thus may be used to wrap the object to form a 3D output as shown in FIG. 4.

As shown at the second stage 704, a user interacts with the digital image to apply digital paint 708 to the second face 114. The digital paint 708 is applied, however, directly to the two-dimensional texture map 222 using the two-dimensional painting engine 502. As such, this defines which portions (e.g., polygons and portions of polygons) of the two-dimensional texture map 222 receive paint, which is the output as part of the digital image 106.

As previously described, the two-dimensional texture map 222 defines which landmarks 208 of the object 206 correspond with points of the 3D model 210. Accordingly, different two-dimensional texture maps may be used for different objects (e.g., the first, second, and third faces 112, 114, 116) to define how those objects are fit to the 3D model 210. However, although different the two-dimensional texture maps 222 used by these different objects have a corresponding structure, e.g., similar landmarks 208 and relationships between the landmarks are used to form polygons that define the maps. By leveraging this corresponding structure of the maps, the digital paint may be transferred from the second face 114 to the first and third faces 112, 116 using corresponding two-dimensional texture maps, an example of which is shown at the third stage 706. In this way, the digital paint is readily transferred between objects in a digital image 706 and/or to another digital image.

Further, this may support use of "preconfigured" collections of digital paint that are selectable by a user through interaction with a user interface for application to respective objects. For example, the object detection module 204 of FIG. 2 may be employed to detect a type of object in a digital image 106. In response, the object detection module 204 obtains digital paint 224 and/or even 3D models 210 that correspond to the detected type of object. This may be used to configure the detected object to receive the paint.

Returning again to FIG. 2, as previously described semantic labels 216 may be specified for corresponding portions of the 2D texture map 222 based on the 3D model 210. The 2D texture map 222, for instance, may define which polygons correspond to a user's eyes, inner mouth, and so forth. This may then be used by a semantic control module 226 of the object paint control module 218 to control application of digital paint 224 based on these semantic labels 216, an example of which is described in the following and shown in a corresponding figure.

Figure 8:
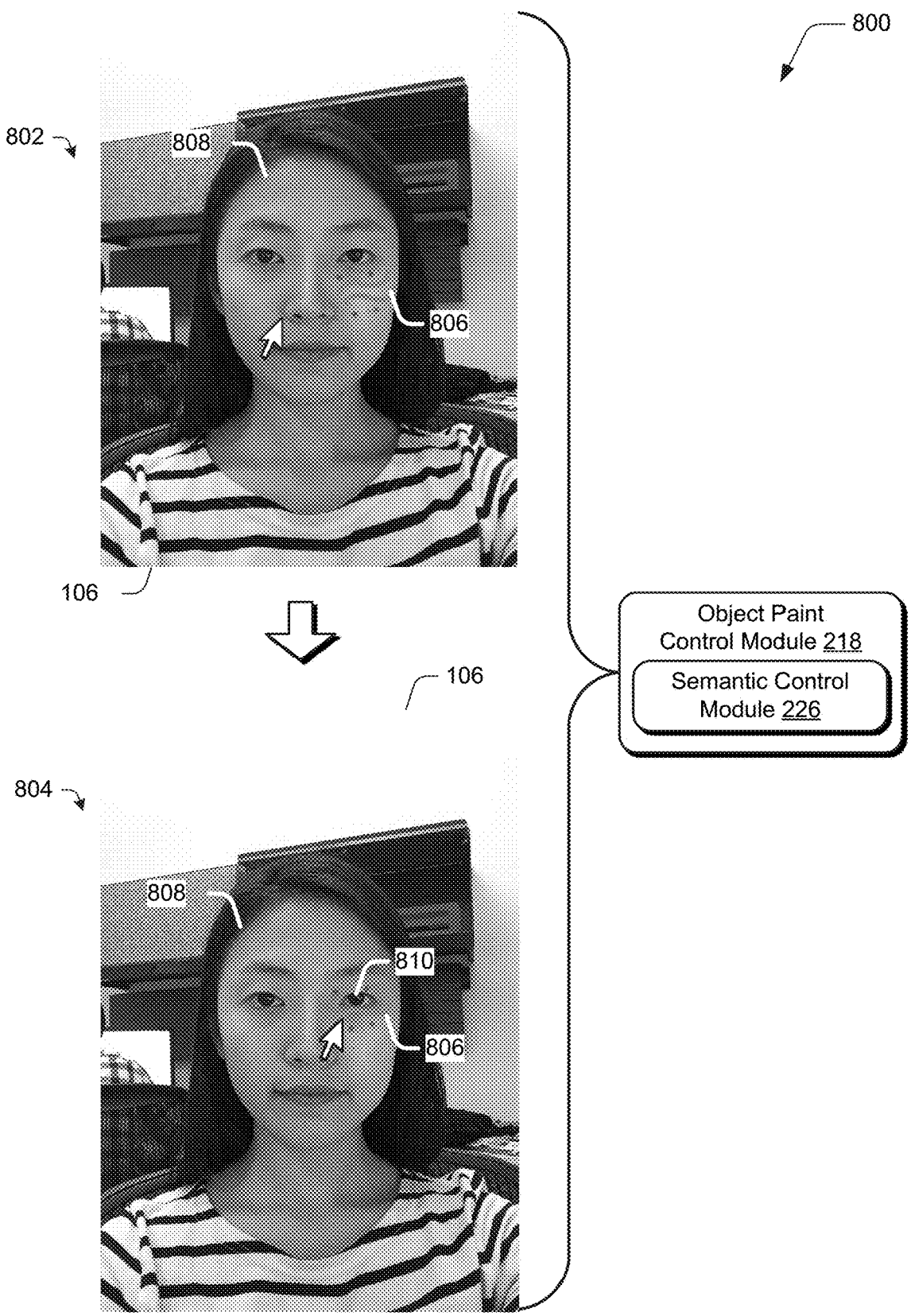
FIG. 8 depicts an example implementation in which semantic labels are used to control application of digital paint to an object in a digital image.

FIG. 8 depicts an example implementation 800 in which semantic labels are used to control application of digital paint to an object in a digital image 106. This example implementation 800 is illustrated using first and second stages 802, 804. At the first stage 802, digital paint 806 is applied to a face 808 in a digital image 106, e.g., drawn using the techniques of FIG. 4 or transferred using the techniques of FIGS. 6 and 7.

At the second stage 804, the digital paint 806 is moved to a new location that includes an eye 810 of the user. The semantic control module 226, by leveraging semantic labels 216 assigned to polygons that correspond to the eye, restricts the digital paint 806 from being applied to the eye 810. In this way, the semantic control module 226 may preserve realistic results automatically and without user intervention, thereby permitting positioning of the digital paint 806 at a variety of locations on the face 808 without requiring a user to manually modify the digital paint 806. Other examples are also contemplated, such as to control which colors are permitted to be applied to particular portions of an object, contrast, hues, brightness, and so forth.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
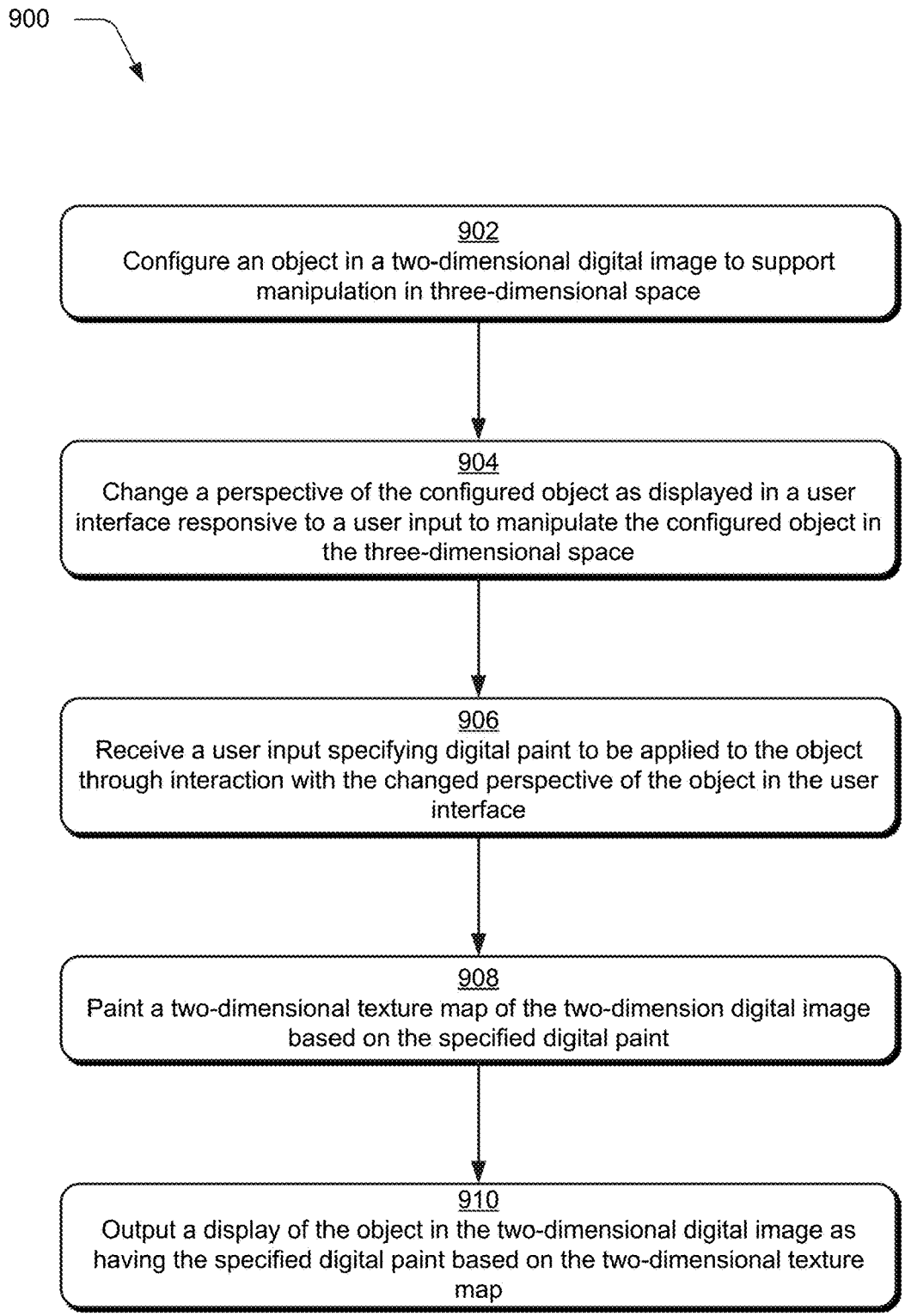
FIG. 9 is a flow diagram depicting a procedure in an example implementation in which a perspective of an object in a two-dimensional digital image is changed to permit receipt of digital paint.

FIG. 9 depicts a procedure 900 in an example implementation in which a perspective of an object in a two-dimensional digital image is changed to permit receipt of digital paint. The object in the two-dimensional digital image is configured to support manipulation in three-dimensional space (block 902). In one example, an object detection module 204 is used to detect an object 206 and landmarks 208 of the object within the digital image 106. The landmarks 208 of the object 206 are then fit to corresponding points 308 of a 3D model 210 to support output of different perspectives of the object, e.g., to move the object in three dimensional space.

A perspective is changed of the configured object as displayed in a user interface responsive to a user input to manipulate the configured object in the three-dimensional space (block 904). The user, for instance, may use a cursor control device (e.g., mouse), gesture, spoken utterance, and so forth to provide the user input to cause movement of the configured object in three-dimensional space in a user interface such that the user may view a portion of the object that was not previously viewable in the two-dimensional digital image 106, e.g., a user's cheek as shown in FIG. 4.

A user input is received specifying digital paint to be applied to the object through interaction with the changed perspective of the object in the user interface (block 906). The user, for instance, may interact with a two-dimensional painting engine 502 to apply the digital paint. In response, a two-dimensional texture map 222 of the two-dimension digital image is digitally painted based on the specified digital paint (block 908). A display is output of the object in the two-dimensional digital image as having the specified digital paint based on the two-dimensional texture map (block 910).

Figure 10:
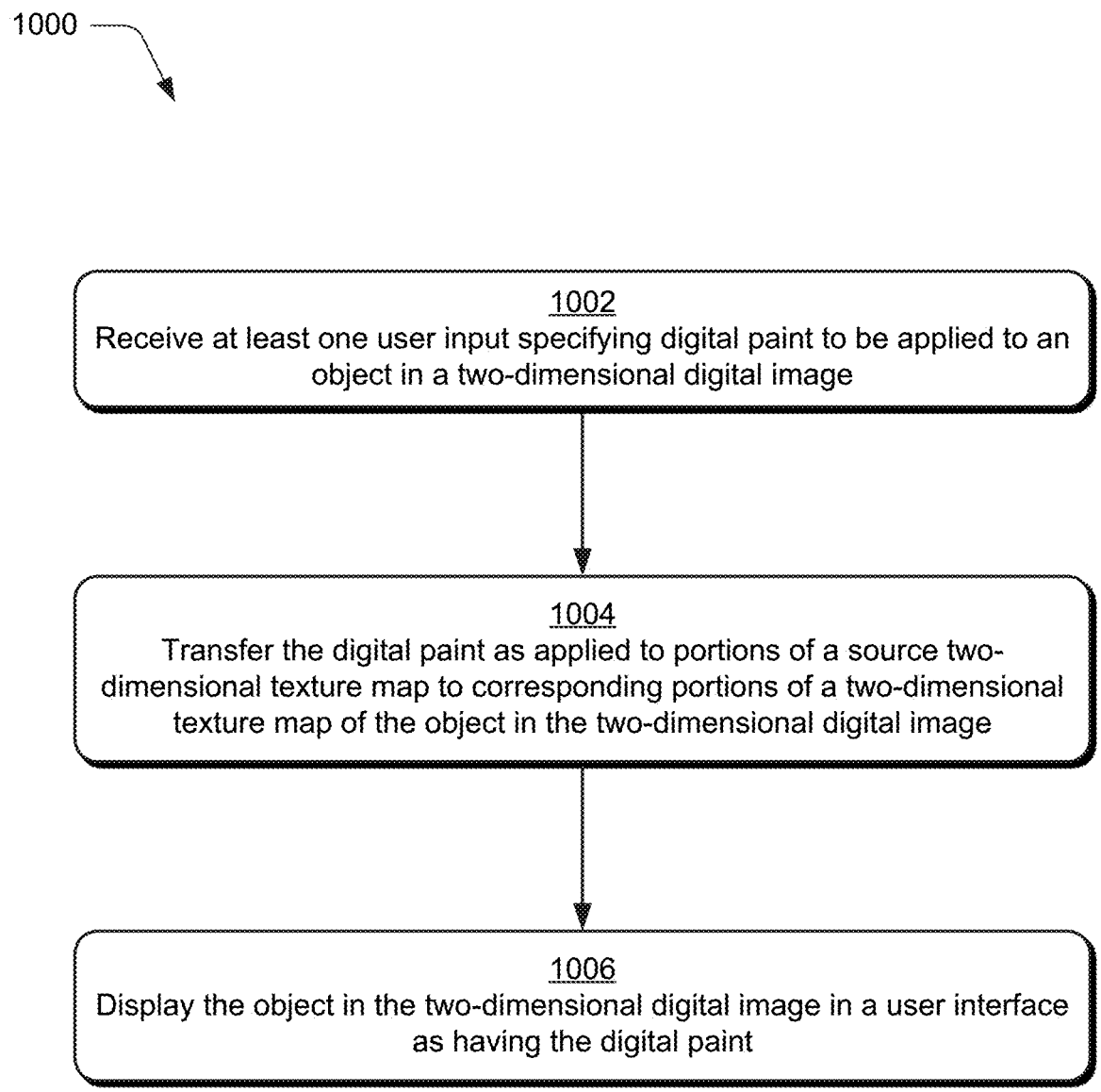
FIG. 10 is a flow diagram depicting a procedure in an example implementation in which digital paint is transferred from one object to another in one or more digital images through use of two-dimensional texture maps.

FIG. 10 depicts a procedure 1000 in an example implementation in which digital paint is transferred from one object to another in one or more digital images through use of two-dimensional texture maps. At least one user input is received specifying digital paint to be applied to an object in a two-dimensional digital image (block 1002), e.g., to digitally paint the object manually as shown in FIG. 4 as part of a source digital image. In another example, the user may select an option in a user interface to select preconfigured digital paint as applied to portions of a source two-dimensional texture map.

The digital paint as applied to portions of a source two-dimensional texture map are transferred to corresponding portions of a two-dimensional texture map in the two-dimensional digital image (block 1004). Again, this may be performed from manually entered digital paint or a selection of preconfigured digital paint. Regardless of how the digital paint originated, the digital paint is then transferred between corresponding portions of the two-dimensional texture maps. The object is then displayed in the two-dimensional digital image in a user interface as having the digital paint (block 1006), e.g., rendered by a display device 110 of FIG. 1.

Example System and Device

Figure 11:
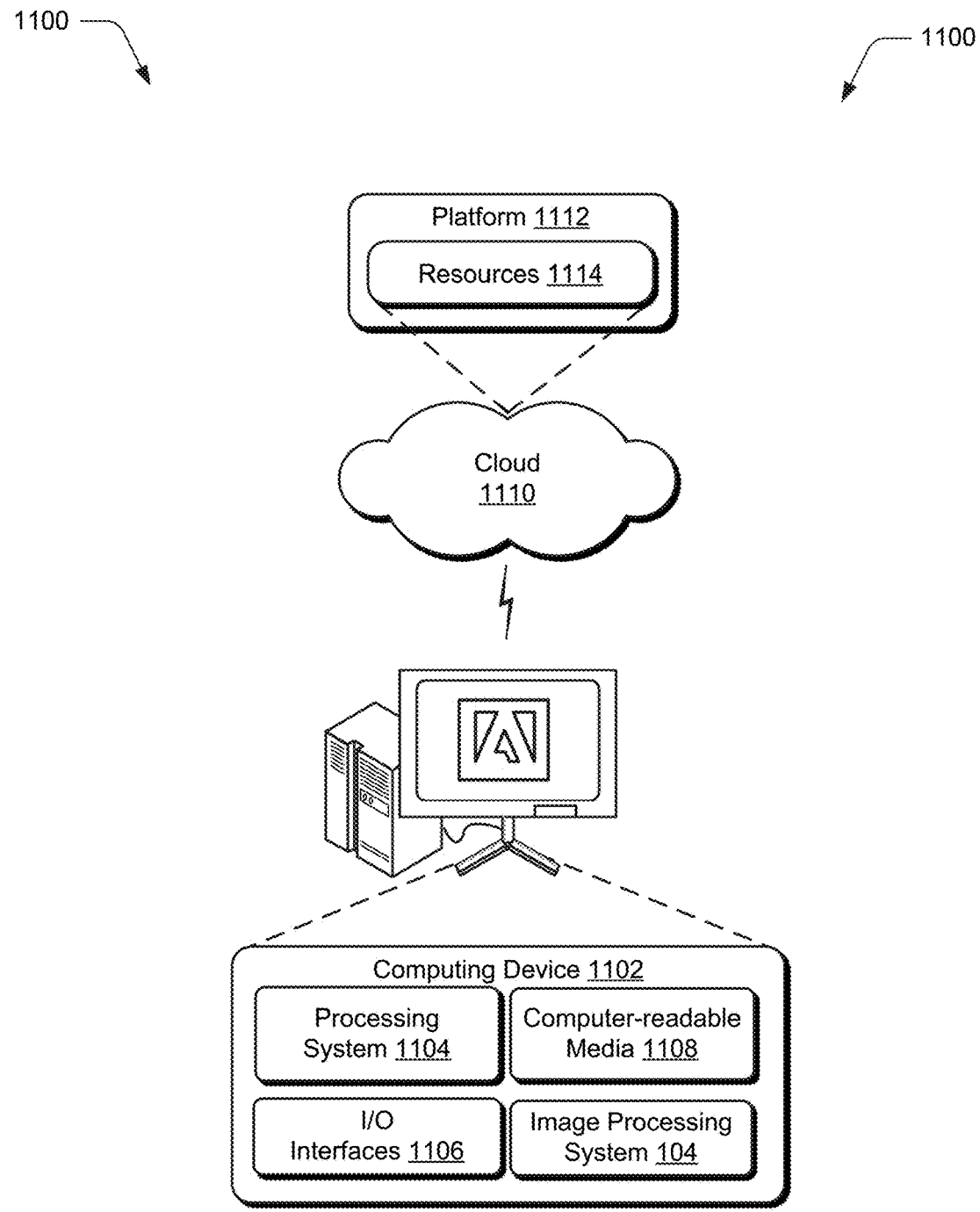
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image processing system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1108, and one or more I/O interfaces 1106 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 may be implemented, at least in part, in hardware elements that may be configured as processors, functional blocks, and so forth. This may include implementation in hardware as an application specific integrated circuit or other logic device formed using one or more semiconductors. The hardware elements are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1108 is illustrated as including electronic storage 1112. The electronic storage 1112 represents memory/storage capacity associated with one or more computer-readable media. The electronic storage 1112 may include volatile media (such as random access memory (RAM)) and/or nonvolatile media (such as read only memory (ROM), Flash memory, optical disks, magnetic disks, and so forth). The electronic storage 1112 may include fixed media (e.g., RAM, ROM, a fixed hard drive, and so on) as well as removable media (e.g., Flash memory, a removable hard drive, an optical disc, and so forth). The computer-readable media 1108 may be configured in a variety of other ways as further described below.

Input/output interface(s) 1106 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, computer-readable media 1108 and other hardware elements are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1110 via a platform 1112 as described below.

The cloud 1110 includes and/or is representative of a platform 1112 for resources 1114. The platform 1112 abstracts underlying functionality of hardware (e.g., servers) and software resources 1114 of the cloud 1110. The resources 1114 may include applications and/or data that can be utilized while computer processing is executed on servers that are remote from the computing device 1102. Resources 1114 can also include services provided over the Internet and/or through a subscriber network, such as a cellular or Wi-Fi network.

The platform 1112 may abstract resources and functions to connect the computing device 1102 with other computing devices. The platform 1112 may also serve to abstract scaling of resources to provide a corresponding level of scale to encountered demand for the resources 1114 that are implemented via the platform 1112. Accordingly, in an interconnected device embodiment, implementation of functionality described herein may be distributed throughout the system 1100. For example, the functionality may be implemented in part on the computing device 1102 as well as via the platform 1112 that abstracts the functionality of the cloud 1110.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transfer digital paint between two-dimensional digital image objects, a computing device comprising:
    a processing system configured to perform one or more operations; and
    a computer-readable storage medium having instructions stored thereon that, responsive to execution by the processing system, causes the processing system to perform operations including:
        receiving at least one user input specifying digital paint to be applied to a two-dimensional texture map of the object in a two-dimensional digital image;
        transferring the digital paint as applied to portions of a two-dimensional texture map of a source object to corresponding portions of the two-dimensional texture map of the object in the two-dimensional digital image, the transferring including restricting the transferring of the digital paint onto at least one corresponding portion of the corresponding portions based on a semantic label assigned to the at least one corresponding portion; and
        displaying the object in a user interface as having the digital paint.

2. The computing device as described in claim 1, wherein the digital paint is applied to the two-dimensional texture map of the source object by:
    configuring the source object implemented in two dimensions to support manipulation in three-dimensional space;
    changing a perspective of the configured source object as displayed in the user interface responsive to a user input to manipulate the configured source object in the three-dimensional space;
    receiving a user input specifying digital paint to be applied to the source object through interaction with the changed perspective of the source object in the user interface;
    painting the two-dimensional texture map of the source object on the two-dimension digital image directly based on the specified digital paint from the received user input; and
    outputting a display of the source object in the as having the specified digital paint based on the two-dimensional texture map of the source object.

3. The computing device as described in claim 2, wherein the operations further comprise receiving a user input to initiate painting of the source object and wherein the configuring is performed responsive to the receiving.

4. The computing device as described in claim 2, wherein the configuring includes:
    detecting landmarks of the source object,
    fitting a three-dimensional model to the source object based on the landmarks to configure the source object to support manipulation in three-dimensional space in the user interface; and
    wherein the changing of the perspective of the configured source object is based on the fitting to the three-dimensional model.

5. The computing device as described in claim 1, wherein the semantic label assigned to the at least one corresponding portion identifies a particular portion of a face.

6. The computing device as described in claim 1, wherein the object includes a face.

7. The computing device as described in claim 1, wherein the source object and the object are both included in the two-dimensional image.

8. The computing device as described in claim 1, wherein the source object is included in a two-dimensional digital image separate from the two-dimensional digital image that includes the object.

9. In a digital medium environment to transfer digital paint between two-dimensional digital image objects, a method implemented by a computing device, the method comprising:
    receiving, by the computing device, at least one user input specifying digital paint to be applied to a two-dimensional texture map of an object in a two-dimensional digital image;
    transferring, by the computing device, the digital paint as applied to portions of a source two-dimensional texture map of a source object to corresponding portions of a two-dimensional texture map of the object in the two-dimensional digital image, the transferring including restricting the transferring of the digital paint onto at least one corresponding portion of the corresponding portions based on a semantic label assigned to the at least one corresponding portion; and
    displaying, by the computing device, the object in the two-dimensional digital image in a user interface as having the digital paint.

10. The method as described in claim 9, wherein the digital paint is applied to portions of the source two-dimensional texture map by:
    configuring, by the computing device, the source object implemented in two dimensions to support manipulation in three-dimensional space:
    changing, by the computing device, a perspective of the configured source object as displayed in the user interface responsive to a user input to manipulate the configured source object in the three-dimensional space;
    receiving, by the computing device, a user input specifying the digital paint to be applied to the configured source object through interaction with the changed perspective of the configured source object in the user interface; and
    painting, by the computing device, the source two-dimensional texture map based on the specified digital paint as applied to the configured source object.

11. The method as described in claim 10, wherein the source object and the object are both included in the two-dimensional digital image.

12. The method as described in claim 10, wherein the source object is included in a two-dimensional digital image separate from the two-dimensional digital image that includes the object.

13. The method as described in claim 10, wherein the configuring includes:
  detecting, by the at least one computing device, landmarks of the source object;
  fitting, by the at least one computing device, a three-dimensional model to the source object based on the landmarks to configure the source object to support manipulation in three-dimensional space; and
  wherein the changing of the perspective of the configured object is based on the fitting to the three-dimensional model.

14. The method as described in claim 9, wherein the object is a face.

15. The method as described in claim 9, wherein the semantic label assigned to the at least one corresponding portion identifies a particular portion of a face.

16. In a digital medium environment to transfer digital paint between two-dimensional digital image objects, a system comprising:
  means for digitally painting an object in a user interface by:
    receiving a user input specifying digital paint to be applied to a two-dimensional texture map of the object in a two-dimensional digital image;
    transferring the digital paint as applied to portions of a source two-dimensional texture map of a source object to corresponding portions of a two-dimensional texture map of the object in the two-dimensional digital image, the transferring including restricting the transferring of the digital paint onto at least one corresponding portion of the corresponding portions based on a semantic label assigned to the at least one corresponding portion; and
  displaying, by the computing device, the object in the two-dimensional digital image in the user interface as having the digital paint.

17. The system as described in claim 16, wherein the object is included in a different two-dimensional digital image from the two-dimensional digital image that includes the source object.

18. The system as described in claim 16, wherein the object is a face.

19. The system as described in claim 16, further comprising:
  means for detecting landmarks of the source object implemented in two dimensions;
  means for fitting a three-dimensional model to the source object based on the landmarks to configure the source object to support manipulation in three-dimensional space in the user interface; and
  means for digitally painting the source object in the user interface by:
    changing a perspective of the configured source object as displayed in the user interface responsive to a user input to manipulate the configured source object in the three-dimensional space, and
    painting a two-dimensional texture map of the source object in the directly based on the user input.

20. The system as described in claim 16, wherein the source object and the object are both included in the two-dimensional image.

* * * * *

UNITED STATES PATENT AND TRADEMARK OFFICE
CERTIFICATE OF CORRECTION

PATENT NO. : 10,755,459 B2
APPLICATION NO. : 15/297938
DATED : August 25, 2020
INVENTOR(S) : Zhili Chen et al.

Page 1 of 1

It is certified that error appears in the above-identified patent and that said Letters Patent is hereby corrected as shown below:

In the Claims

Column 14, Line 7, Claim 4 after "landmarks of the source", delete "object,", insert -- object; --, therefor.

Signed and Sealed this
Third Day of November, 2020

Andrei Iancu
*Director of the United States Patent and Trademark Office*